May 2, 1939.  A. C. LINDGREN ET AL  2,156,569
PLOW ATTACHMENT FOR TRACTORS
Filed May 9, 1936   4 Sheets-Sheet 2
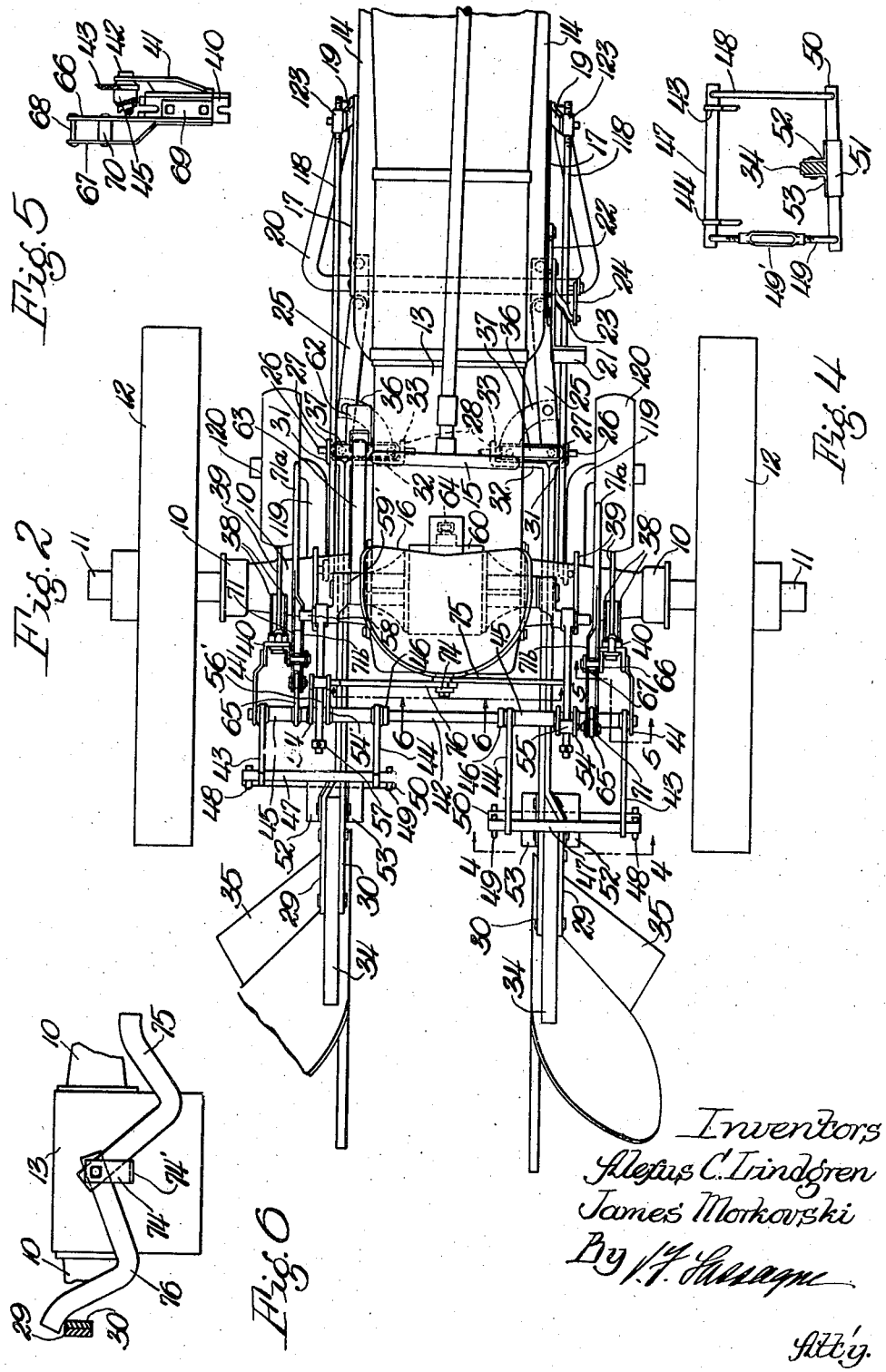
Inventors
Aletus C. Lindgren
James Morkovski
By V. F. Sussagne
Atty.

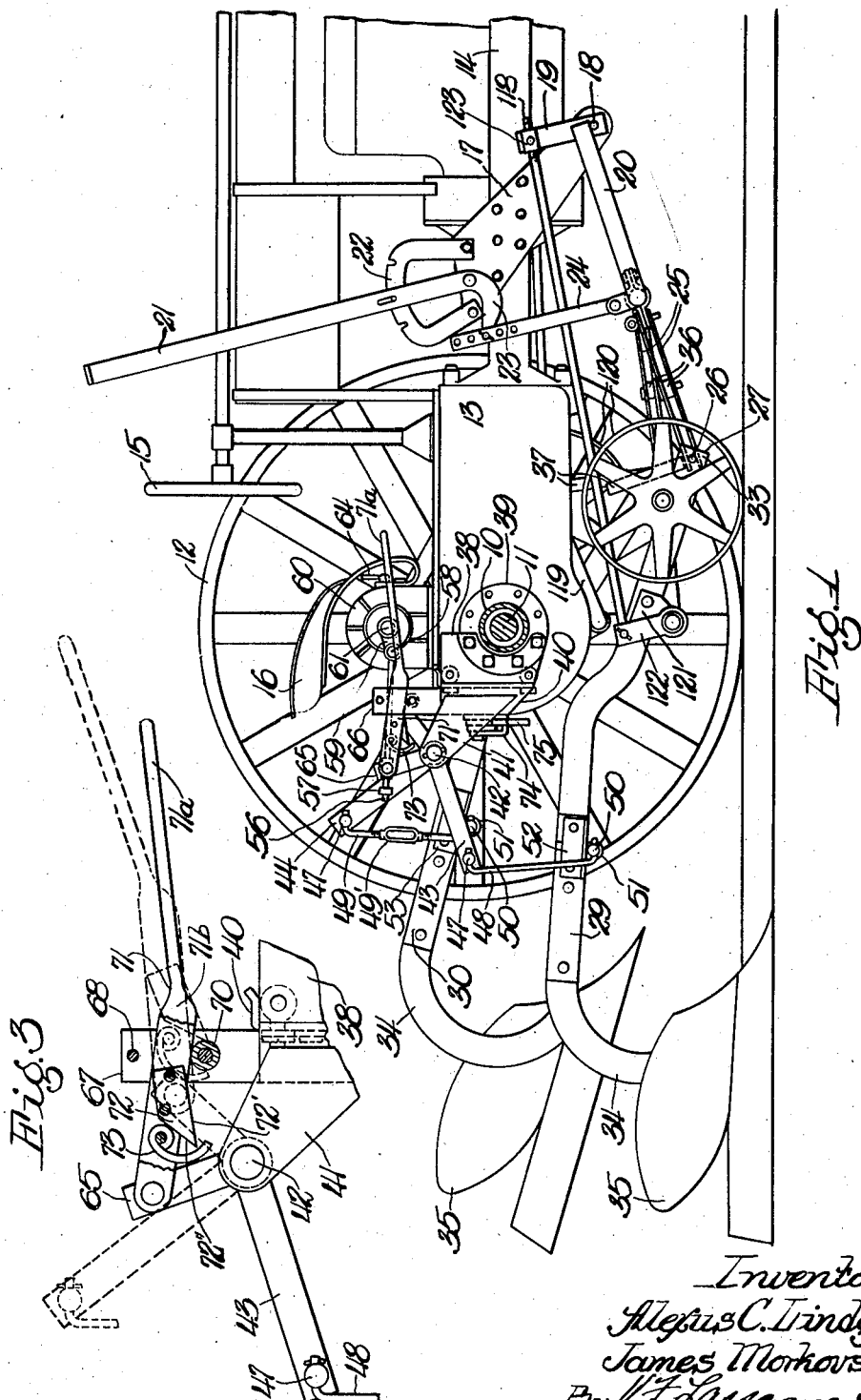

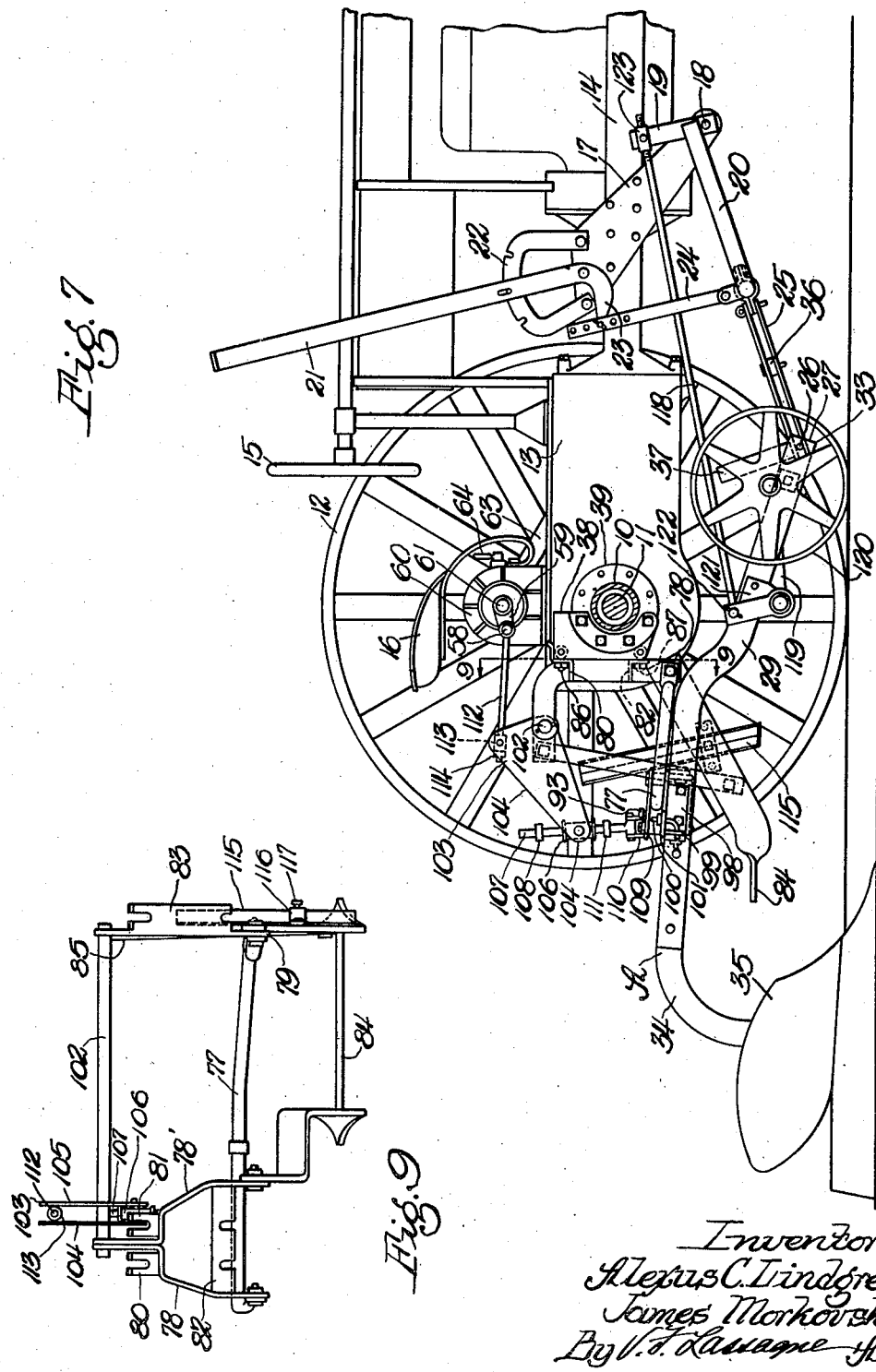

May 2, 1939.  A. C. LINDGREN ET AL  2,156,569
PLOW ATTACHMENT FOR TRACTORS
Filed May 9, 1936   4 Sheets-Sheet 4
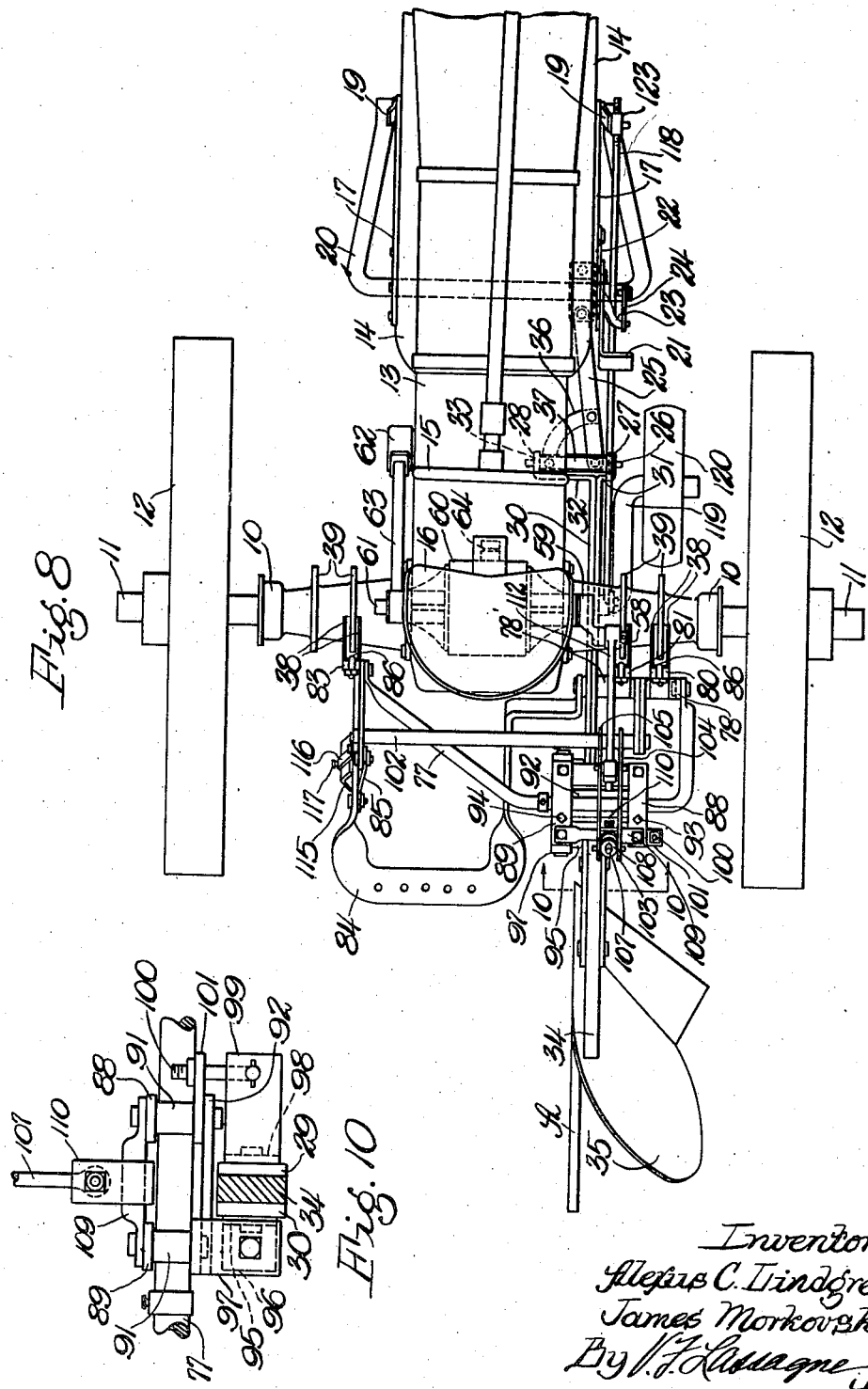
Inventors
Alexis C. Lindgren
James Morkovski
By V. F. Lavagne
Atty.

Patented May 2, 1939

2,156,569

UNITED STATES PATENT OFFICE 2,156,569

PLOW ATTACHMENT FOR TRACTORS

Alexus C. Lindgren, Chicago, and James Morkovski, Canton, Ill., assignors to International Harvester Company, a corporation of New Jersey Application May 9, 1936, Serial No. 78,801

14 Claims. (Cl. 97—50)

The present invention relates to tractor carried plows and, more particularly, to structure for connecting a plow gang or gangs to a tractor and also to mechanism for raising and lowering the plow gangs.

The main obects of the invention are to provide a simplified, close coupled type of connecting means for tractor gang plows; to provide for maintaining a constant depth of plowing unaffected by movements of the tractor over rough ground; and, to provide for balancing of the draft forces; and, in addition, to provide for raising and lowering of the plows from operating to transporting position, either simultaneously or separately.

More specifically, the object of the invention is to provide a two-way gang plow attachment having the advantages stated and permitting the use of single bottom or more gang units in close coupled relation between the traction wheels of a so-called row crop tractor of the type having a high frame and rear axle structure on which lifting and lowering mechanism for the plows is located.

Another object of the invention is to provide a novel means for latching the lifting mechanism for each implement frame when it is in raised position for transporting.

Another object of the invention is to provide a plow attachment in which the latching means is so positioned with respect to the lifting mechanism that the lifting mechanism itself may be used to positively lock the latching means.

Another object of the invention is to provide a directly connected gang plow which has adjustable connections with its carrying frame whereby the plow may be adjusted for lateral tilt.

Other minor objects and advantages will become apparent to those skilled in the art from the detailed description of the preferred embodiment of the invention to follow.

The invention accordingly resides in the combination and details of construction hereinafter described and claimed and illustrated in the accompanying drawings, wherein:

Figure 1 is a side view of the rear end of the tractor with the right rear wheel removed, showing the two-way plow with one of the gangs in plowing position and the other in raised or transporting position, and the hydraulic lift mechanism for raising the plows;

Figure 2 is a plan view of the two-way plow showing the rear of a tractor with the plow gangs connected thereto;

Figure 3 is an enlarged detailed view of the latching mechanism for locking the implement frame in raised or transport position;

Figure 4 is a sectional view along line 4—4 of Figure 2, looking in the direction of the arrows;

Figure 5 is an enlarged section of the latch taken on line 5—5 of Figure 2;

Figure 6 is a section taken along line 6—6 of Figure 2, showing the guide members for the plow beams;

Figure 7 is a side view of the rear end of the tractor with the right rear wheel removed showing a one-way plow in lowered or plowing position and the hydraulic lift mechanism for raising the plow;

Figure 8 is a plan view of the one-way plow showing the rear end of a tractor with the plow gangs connected thereto;

Figure 9 is a sectional view of the connecting structure for the one-way plow, taken along the line 9—9 of Figure 7; and, Figure 10 is an enlarged view of the connection of the lifting mechanism to the plow bail along the line 10—10 of Figure 8, looking in the direction of the arrows.

The invention is illustrated in combination with a motor propelled vehicle or implement carrying frame, such as a tractor of the type having a wide tread rear axle structure with the rear wheels adjustable thereon. The tractor has a rear axle housing 10 from which the differentially driven axle shafts 11 project. The shafts 11 have traction wheels 12 adjustably secured thereto in any suitable manner. The tractor has a forwardly extending body portion 13 including side sills 14 which extend to the front end of the tractor, which is supported on dirigible steering wheels, not shown. The dirigible wheels are controlled through a steering wheel 15 located adjacent an operator's seat or station 16.

In the practice of the present invention a depending hanger member 17 is bolted, or otherwise secured, to each sill member 14 at about the middle of the tractor, as seen in Figures 1, 2, 6 and 7. The hanger members are preferably inclined forwardly and at their lower ends they have pivoted therein a transverse shaft 18. Welded, or otherwise secured, to the transverse shaft 18 are upright arms 19. Welded to the upright arms 19 is a rearwardly extending U-shaped draw-bar 20. The upper ends of the upright arms 19 lie above the plane of the draw-bar proper. One of the hanger members 17 at its upper end has mounted thereon a hand lever 21 and its locking or adjusting quadrant 22. This lever is provided with an angularly extending arm 23 to which a supporting link 24 is adjustably connected. At its lower end the link 24 is pivotally connected to the draw-bar 20. By this arrangement, movement of the lever 21 will serve to adjust the draw-bar vertically, as will be obvious.

As best seen in Figures 1, 2, 7 and 8, the draw-bar has pivotally connected to it at any selected point on its transverse portion, a coupling link 25. As the invention is to be described in connection with both the two-way and a one-way plow, like parts will be denoted by similar reference characters and, as both of the plow constructions are similar with the exception of being right or left-handed as the case may be, or for a one-way or two-way construction, only one plow and its structure will be described. The coupling link 25 is connected at its rear end to a draft connection 26 laterally positioned on projections 27 and 28 of longitudinally extending beam members 29 and 30. The longitudinal beam members 29 and 30 have lateral extensions 31 and 32 with the extension 32 extending inwardly more than the lateral extension 31 extends outwardly, thus forming a draft bracket 33 fixed on the inner side of the forward ends of the plow beam members 29 and 30.

The beam extensions 29 and 30 extend underneath the axle housing of the tractor and are connected at their rear ends to a stub plow beam 34, which carries a plow bottom 35. The connection between the link 25 and the bracket 33 is through the transverse pivot member 26, which has its ends supported in the forwardly extending portions 27 and 28 of the beam extensions 29 and 30. In order to provide for anguular adjustment of the plow and beam, an arcuate link or arm 36 adjustably connects the coupling link 25 with a laterally spaced point on the member 26. The connection between the coupling link 25 and the draw-bar 20 is such as to permit free lateral and vertical movement of the plow with respect to the tractor, but the range of the vertical movement of the coupling link 25 and, therefore, of the forward end of the plow beam is preferably limited, as by an upstanding stop or abutment member 37 carried by the member 26 in position to contact the bottom of the tractor body. Thus it should be seen that the plow bottoms and their beams are movably mounted on the tractor for both lateral and vertical movement.

In order to raise and lower the plow from and to operating position, there is supported from the rear axle 10 of the tractor, suitable power lift or raising and lowering mechanism. The mechanism is supported by coupling members 38 in the form of horse-shoe coupling members attached to flanges 39 integral with the axle housing 10. Supported from the coupling members 38 are supporting brackets 40. The present disclosure of the raising and lower mechanism is for the two-way plow gangs and the raising and lowering mechanism for the one-way plow gang will be described later. The supporting brackets 40 for the two-way plow are laterally spaced to the outer flange members 39 on each axle housing extending from the longitudinal body portion 13. The supporting brackets 40 are formed so that they may be readily attached to and detached from the coupling members 38 in order that the two-way plow attachment may be readily attached to and detached from the tractor. Extending rearwardly from the supporting brackets 40 are brackets 41 welded, or otherwise secured, to the supports 40. Transversely extending across the rear end of the tractor and to the rear thereof is a transverse support 42 in the form of a shaft which is secured in the brackets 41. Mounted on the transverse shaft 42 for oscillation are bail members or lifting arms 43 and 44 which may also be considered as adapted for alternate movement in opposite directions. The arms 43 and 44 are laterally spaced by a spacing member 45, which also acts to journal the arms 43 and 44 on the shaft 42. The bail mechanism including the shaft 42 and arms 43 and 44 may be considered as the lifting means, or, when taken with a power lift mechanism, the entirety may be considered as power means mounted on the implement carrying frame. As each of the lifting mechanisms for each plow beam of the two-way plow is the same, only one will be described and like reference characters will denote similar parts. The lifting bail mechanism is held in lateral position by a collar 46. Attached to the rear ends of the arms 43 and 44 is a transverse shaft 47, which is journaled in the arms 43 and 44. Parallel lifting links 48 and 49, as best shown in Figures 1, 2 and 4, are pivotally connected at their upper ends to the transverse member 47 and at their lower ends to a similar transverse member 50, which is journaled in the transverse bearing 51. The plow beams 29 with their draft connections and lifting links 48 and 49 may be considered as a plurality of flexibly mounted implement gangs adapted for alternate movement. A transverse bearing 51 is welded, or otherwise secured, to supporting brackets 52 and 53 attached to the plow beam, as best shown in Figures 1, 2 and 4. It is to be understood that the link 49 may be adjustable with respect to the link 48 in order to tiltingly adjust or level the plow bottom. This is accomplished, as best shown in Figure 4, by a turn buckle adjustment 49'. Welded, or otherwise secured, to the bearing portion or spacing member 45 are crank arms 54 and 54', which are laterally spaced. Journaled to the upper end of the crank arms 54 and 54' is a pivoted lost motion connection 55. It is to be understood that each of the plow lifting mechanisms has similar lifting constructions and that only one need be described, and like reference characters will denote similar parts.

The actuating mechanism for raising and lowering the plow beam is connected to the crank arm construction 54 and 54' by means of a lifting link 56 slidably mounted in the lost motion connection 55. The position of the lifting link for adjusting the depth of the plow bottom is controlled by an adjusting collar 57. The adjusting collar 57 also adjusts the maximum lifting position of the plow beam. The lifting link 56 for each plow beam of the two-way plow is connected to an eccentric pin 58 secured to a lifting arm 59 of a hydraulic lifting mechanism 60 of the vane type, disclosed and claimed in the copending application of E. A. Johnston, Serial No. 22,888, filed May 22, 1935 which is now U. S. Patent No. 2,039,801 granted May 5, 1936. The hydraulic lifting mechanism 60 has a transverse shaft 61 to which the crank arms 59 and 59' are secured. The lifting links 56 and 56' are connected to the crank pins 58 and 58', respectively. The hydraulic vane type lifting mechanism 60 is actuated by a gear pump 62 driven from a transverse power take-off shaft operated from the transmission of the tractor. The fluid for the hydraulic lift mechanism is circulated through a pipe construction 63 to the vane lift mechanism 60 where it is controlled by a valve handle or valve means 64. It is to be understood, however, that power lift mechanism of the ordinary one-half revolution construction, or other mechanical lifts, may be used without departing from the scope of my invention.

In order to secure each plow bottom of the two-way plow construction in its raised, or transport position, it has been necessary to provide a latching means or mechanism, as shown in Figures 1, 2 and 3, and which is best shown in Figure 3. Welded, or otherwise secured, to the spacing member 45 of the lifting bail construction is a latch arm 65. On the bracket 40, stop means is formed by upright members 66 and 67 spaced apart at their upper ends by a spacing stud 68, as best shown in Figure 5. The members 66 and 67 are secured at their lower ends to a supporting bracket 69 attached to the supporting bracket 40 for the plow attachment. A stop element 70 is spaced between the members 66 and 67 and secured thereto. In order to latch each plow bottom in its raised or lowered position, a latch connection in the form of a releasable lifting latch handle 71 is pivotally mounted at its rear end to the latch arm 65 and movable therewith. The latch handle 71 has a latch element 72 complementary to the stop 70, secured to the handle and adapted to engage the stop 70, as best shown in Figure 3. The latch handle 71, when it is released from the stop 70, is limited in its upward movement by the stop or stud 68.

The usual procedure in effecting the lowering of a plow bottom is to first lift one of the latch handles to disconnect the latch from the stop means, and then to operate valve control 64 of the power lift. When the power of the lift mechanism comes on, the selected plow bottom will be cushioned to its lowered and ground engaging position. In order to prevent the latch from reengaging with its stop from the time of lifting the latch handle until the power comes on, a curved, pivotally mounted guard member is provided on the latch handle 71, and arranged to fall down over the latch element 72. With the guard 73 lowered, the latch handle will be supported on the stop element 70 by the same, and as the handle moves rearwardly upon the lowering of the plow bottom, it will be guided over stop element 70. Or, if the lift mechanism is already at its lowered position and the plow bottoms are being supported wholly by the latch, guard member 73 will also have its function of aiding the latch element 72 over the stop 70 upon lifting the latch handle 71 to drop the plow bottom by gravity.

The forward portion 71ª of the latch handle 71 extends forwardly within reach of the operator's station 16. The latch member 72 is inclined downwardly and rearwardly so that the under surface 72' will ride over the stop 70 when the plow beam is being raised, whereupon it will fall downwardly with an edge 72" contacting the stop 70 as the guard member 73 moves rearwardly, as shown in the dotted position. The guard member 73 also is free to move and to lock itself about the stop 70 to some extent to prevent the latch handle 71 from jumping out of its locked position.

In order to further lock the latch handle 71 in position, the end of the crank pins 58 and 58' extend laterally, as shown in Figure 2, sufficiently to engage an inner leg 71ᵇ of the forked handle 71. In this position, as best shown in Figure 2 for the left plow bottom, the crank pin 58' engages the member 71ᵇ, therefore, locking the latching means for positively holding the plow beam in raised position. As shown in Figure 2 for the right hand plow beam, the forward portion of the latch handle 71ª is bent laterally outwardly, so that the lateral extension of the crank pin 58 cannot engage the portion 71ᵇ when the plow bottom is in plowing position.

In the operation of the plow raising and lowering mechanism the hydraulic vane lift reciprocates to and fro from the down position, as shown in Figure 1, forwardly to a similar position for the lifting stroke, and it may also be considered as adapted for alternate movement in opposite directions. The total lifting stroke of the lifting vane is greater than 180 degrees in order to form an over-the-center lock for certain types of tools to prevent the weight of the attached implement from returning the lifting mechanism to its lowered position. The hydraulic lift mechanism is actuated through the pump 62, which is continuously driven from the motor through the transmission mechanism of the tractor. The hydraulic lift mechanism may be operated either when the tractor is stationary or when the tractor is moving, so long as the engine is running.

In order to operate the lifting mechanism, the lever or valve means 64 is operated, which controls the flow of the fluid to either side of the lifting vane of the lifting mechanism. In order to lift the plow from its lowered position, as shown in Figure 1, to the lifted position, as shown in Figure 3, the handle is shown in its position to actuate the vane to move forwardly. In doing this, the lifting link 56, which is connected to the crank pin 58 of the crank arm 59 secured to the transverse shaft 61, moves forwardly in unison with the vane of the lift to which the transverse shaft 61 is attached. As the lifting link 56 moves forwardly, the stop collar 57 engages the lost motion connection 55, actuating the lifting arm 43, which is free to oscillate vertically. As the lifting arms 43 and 44 are connected to the plow bottom by the lifting links 48, it is, therefore, apparent that, as the lifting arm 43 is raised, the plow bottom 35 is likewise raised. As the lifting arm 43 is raised, the latch arm 65, being connected to the lifting bail construction, also moves forwardly. Therefore, the latch handle 71, which is connected to the latch arm 65, moves forwardly, allowing the latch element 72 to cam over the stop 70, whereupon, as the latch element 72 passes the stop 70, the latch 71 is free to fall by gravity, thus locking the plow bottom in its raised position, as shown for the left hand plow in Figures 1 and 2, and in the enlarged view of Figure 3.

If necessary, both plows, if they are in their lowered position for any reason, may be simultaneously lifted by the actuation of the vane lifting mechanism, and, when they are in their raised or transporting position, both plows may be positively held in this position by reversing the vane lift, so that the crank pins 58 and 58' are in the position shown to engage the members 71ᵇ of their respective latch handles, as best shown for the left hand plow bottom in Figure 2. It is to be understood that the member 58 will also engage its corresponding member 71ᵇ for the right hand plow bottom when the right hand plow bottom is in its raised position. By so positioning the crank pins 58 and 58' the respective latch handles will be held down so that they cannot be released. Thus, locking means associated with the power lift is provided for locking the latching means to positively hold the plows in their transport position on the tractor.

When the operator is ready to plow, the vane lift is actuated to release the crank pins 58 and 58', so that the crank pins are in their forward position to that shown in Figure 1. When the crank pins are in this position, the latch handles 71ᵃ are free to be disengaged from the stop 70. The vane lift and its crank arms 59 and 59' are free to be operated in either direction when the plows are in their latched position because of the lost motion connection formed by the lifting link 56 and the lost motion connection member 55. It is to be understood that the operator, when the crank pins 58 and 58' are so positioned as to release the latch handle 71, by lifting both latch handles together may allow both plow bottoms to drop together, especially when it is necessary to detach the two-way plow from the tractor. When the plow is dropped in this manner, the fall is cushioned by the fluid being displaced in the hydraulic lift mechanism, as disclosed and claimed in assignee's copending application of E. A. Johnston, Serial No. 87,889, filed June 29, 1936, which acts to dampen the fall of the plow bottom and this throttling or damping action in the lift mechanism is known as a slow drop. When the operator wishes to lower either of the plow bottoms, when the crank pins 58 and 58' are in their forward position, he lifts the latch handle of the respective plow bottom that he wishes to lower, and then, operating the valve handle 64 of the hydraulic lift mechanism, drops the plow bottom while the other plow bottom remains in its raised position because of its being latched in position and also because of the lost motion connection between the lifting link and its respective lost motion pivot connection.

In two-way plow constructions for this type of tractor, as the plow beams extend longitudinally underneath the frame of the tractor, the plow beams may, at times, contact the longitudinal body portion 13, when the plows are actuated to be raised, thus preventing the plow beams from being raised. In order to prevent this occurrence, an attachment has been provided to be mounted on the rear of the tractor to guide the plow beams laterally, as they are being raised by the lifting mechanism. The guide mechanism also prevents the lateral swinging inwardly of the plow beams in transporting position and also prevents the plow, when it is raised, from swinging inwardly in side hill plowing. The attachment comprises a supporting member 74 attached to the rear of the tractor at its mid-portion. The supporting member 74 is U-shaped in construction and has pivoted in the space between the legs laterally extending guide arms 75 and 76, as best shown in Figures 1, 2 and 6. The guide members 75 and 76 are angular in shape with one leg extending downwardly and the other leg extending upwardly and outwardly. The bottom edge of the guide members 75 and 76 engage the beam of the plow, as the plow is raised, acting to guide the plow beams laterally outwardly from underneath the longitudinal frame portion of the tractor. When the guide members are in raised position, as shown by the left hand member 76, the plow beam in raised position is prevented from inward movement.

The guide members 75 and 76 are limited in their downward position by the bottom 74' of the U-shaped supporting bracket 74, which acts as a stop. It is obvious that a very simple mechanism has been provided to guide the plow beams laterally outwardly from underneath the frame of the tractor when the plow beams are being raised.

The one-way plow construction, as disclosed in Figures 7, 8, 9 and 10, is similar to the construction disclosed in the patent to W. S. Graham et al. 1,902,845 granted March 28, 1933, and to the patent to A. C. Lindgren et al. 1,941,013, granted December 26, 1933. The one-way plow construction, as shown in the aforementioned figures, is also similar to the plow construction in the assignee's copending application of Bert R. Benjamin et al., Serial No. 35,416, filed August 9, 1935. As best shown in Figures 7 and 8, coupling plates 38, similar to those disclosed for the two-way plow, are attached to the inner flange members 39. To raise and lower the plow from and to operating position, the axle housing of a tractor has pivotally connected thereto a rearwardly extending bail 77. The legs of the U-shaped bail 77 are pivotally connected to supporting members 78 and 79, as best shown in Figure 9. The supporting members 78 and 79 have members 80, 81, 82 and 83 welded, or otherwise secured, thereto. In addition, the members 81 and 82 are welded to an additional supporting member 78', to which is connected a U-shaped draw-bar 84. The additional draw-bar 84 is provided with holes for attaching the clevises of additional implements which may be trailed from the draw-bar 84 and still have the plow attachment A secured to the tractor. A brace 85 extending from the member 79 to the draw-bar 84 secures the draw-bar 84 in its proper draft position. The quick attachable and detachable supporting members 80, 81, 82 and 83 have formed thereon attaching members and slots, as best disclosed in the co-pending application to Bert R. Benjamin et al., previously referred to, for attaching to the horse-shoe coupling members 38. Coupling members 38 are attached to the inner and outer flanges 39 on the right axle housing, and to the inner flange 39 on the left axle housing 10. The supporting members 78 and 83 with their corresponding attaching members are attached to the coupling plates 38 by the usual swinging bolts 86 and 87 on the coupling plates. Guide portions are provided on the members 80, 81 and 79 for guiding the implement attachment A onto the coupling members 38. In this manner the plow attachment is rigidly attached to the rear axle of the tractor by means of the supporting members 78 and 79 of the plow attachment A, and by the coupling members 38 secured to the rear axle of the tractor. These coupling members and the construction of the supporting members are similar to the construction of the coupling members and supporting members disclosed in the assignee's copending application of Bert R. Benjamin et al., Serial No. 35,416, filed August 9, 1935.

The bight portion of the bail 77 is positioned immediately above the plow beam formed from the members 29 and 30 and preferably near the end thereof. The members 29 and 30, for the one-way plow construction, are similar to the members 29 and 30 of the two-way plow construction, and, therefore, similar reference characters are used to describe similar parts. The plow beam construction comprises the longitudinally extending beam members 29 and 30 attached to which is the stub plow beam 34 having the usual plow bottom 35 attached thereto. The bail is pivotally connected to the mid-portion of the beam by a support or saddle composed of two pairs of vertically spaced flat bars or straps 88 and 89 and spacers 91. The bail is loosely seated between the straps which are spaced laterally apart, so as to engage the mid-portion or bight portion of the bail at laterally spaced points. A plate 92 connects the two pairs of straps beneath the bail, and the plow beam is located below this plate laterally between the two pairs of straps. Set screws 93 and 94 are adjustably mounted in the upper straps 88 and 89 for aiding in detaching and attaching the plow attachment from and to the tractor. The beam is suspended by means of a bracket piece 95 secured to the inner longitudinal beam member 30 and has laterally extending ears 96 at the ends which are pivotally connected to similar depending ears 97 formed on the lower strap of the pair 89 at that side. On the opposite side, the beam member 29 has a bracket piece 98 fixed to it, which has a laterally extending portion 99. This portion 99 has pivotally mounted therein a vertically extending threaded rod 100, which forms with a laterally extending member 101 secured to the lower strap of the pair 88 a means for adjusting the tilt of the plow bottom. It is to be understood, however, that a spring release may be attached at this point, so that, in case the plow point strikes an obstruction, the beam may be deflected by means of the spring release joint formed therein. For raising and lowering the plow from and to operating position, the supporting members 78 and 79, previously described, have pivotally connected thereto a rearwardly projecting bail 77, the rear or bight portion of which loosely engages in suitable straps 88 and 89 secured to the rear portion of the plow beam, as previously described. Vertical swinging movements of the bail effect lifting and lowering of the plow, and these movements are imparted to the bail by the lifting mechanism now to be described.

The lift comprises a transverse shaft 102 journaled at each end on the ends of the rearwardly extending portions of the supporting members 78 and 79, the member 78 being secured to the right hand coupling members on the tractor axle housing, and the left hand supporting member 79 being secured to the left hand coupling member on the rear axle housing of the tractor. On the right hand end of the shaft 102 is welded, or otherwise secured, a crank arm 103 positioned above the plow beam construction. The crank arm 103 is formed from a plurality of plate members 104 and 105. The end of the crank arm 103 carries a horizontally positioned swivel eye piece or collar 106 mounted between the plate members 104 and 105. The swiveled eye piece 106 slidably receives the upper end of a lift rod 107 having a stop 108 at its upper end. The lower end of the lift rod 107 is pivoted to a transverse member 109 secured to the rear ends of the strap members 88 and 89. The lower portions of the lifting rod 107 have a pivoted connection formed by a U-shaped strap 110 engaging the transverse member 109, the U-shaped strap 110 being pivotally connected to the lower end of the lifting rod 107. Another adjusting collar 111 is mounted on the lifting rod 107 and positioned below the swivel eye piece 106. The adjusting collars 108 and 111 are used to adjust the maximum depth and lift of the plow bottom 35. Extending forwardly from the crank arm 103 to the hydraulic lifting mechanism 60 is a lifting link 112. The lifting link 112 at its rear end is connected between the plate members 104 and 105 of the crank arm 103 by a lost motion swivel connection 113. Attached at the rear end of the lifting link 112 is an adjusting collar 114, which is used to adjust the position of the lifting link 112 in the swivel collar 113. The adjusting link 112 is also used to adjust the plowing depth and maximum lift of the plow bottom. The hydraulic lift mechanism 60 is similar to that disclosed in the hydraulic lift mechanism for the two-way plow construction, and, therefore, like reference characters will denote similar parts. The lifting link 112 is connected at its forward end to the crank pin 58 of the crank arm 59 of the hydraulic lift mechanism. The crank 59 is secured to the transverse shaft 61 attached to the vane mechanism of the hydraulic lift mechanism, as disclosed in the assignee's copending application and patent of E. A. Johnston above referred to. The hydraulic vane type lifting mechanism 60 may be actuated by a gear pump 62 driven from a transverse power shaft connected with the transmission of the tractor. The fluid for the hydraulic lift mechanism is circulated through the pipe construction 63 to the hydraulic lift mechanism 60, where it is controlled by the valve handle 64. It is to be understood, however, that power lift mechanism of the ordinary one-half revolution type, or other mechanical lifts, may be used without departing from the scope of my invention.

Although it is necessary to have special latching mechanism for retaining each of the two-way plows in transport position while one or the other of them is in plowing position, it is not necessary to have this latch mechanism for the one-way plow construction. However, it is to be understood that the one-way plow may be constructed with this latch mechanism. In the operation of the plow raising and lowering mechanism, the hydraulic vane lift reciprocates to and fro from the down position, as shown in Figure 7, forwardly to the opposite position for the lifting stroke. The total lift stroke of the lifting vane is greater than 180 degrees in order to form an over-the-center lock for certain types of tools to prevent the weight of the attached implements from returning the lifting mechanism to its longitudinal position. The hydraulic lift mechanism is actuated through the pump 62, which is continuously driven from the motor through the transmission mechanism of the tractor. The hydraulic lift mechanism may be operated either when the tractor is stationary or when the tractor is moving, so long as the engine is running.

In order to operate the lifting mechanism, the lever 64 is operated, which controls the flow of the fluid to either side of the lifting vane of the lifting mechanism. In doing this, the lifting link 112, which is connected to the crank pin 58 of the crank arm 59 secured to the transverse shaft 61, moves forwardly in unison with the vane of the lift to which the transverse shaft 61 is attached. As the lifting link 112 moves forwardly, the stop collar 114 engages the lost motion connection 113, actuating the lifting arm 103, which is free, to oscillate vertically. As the lifting arm 103 is connected to the plow bottom by the lifting link 107, it is, therefore, apparent that the plow bottom is raised when the lifting arm 103 is raised. The lost motion connection at 113 provides a means whereby the plow bottom, if it strikes an obstruction, is free to rise without damaging the lifting mechanism. When the operator is ready to plow, the vane lift is actuated to operate the lift mechanism, so that the crank pin is in the position shown in Figure 7. When the plow is dropped by the actuation of the lift mechanism, the fall of the plow bottom is cushioned by the fluid being displaced in the hydraulic lift mechanism, which acts to dampen or retard the fall of the plow bottom.

The plow attachment A is detached from the tractor by disconnecting the lifting link 112 from the hydraulic lift mechanism after the adjustable support 115 has been lowered to the ground. The adjustable support 115 is secured to the draw-bar 84 by an adjustable clamp bracket 116. The adjustable support 115 is held in raised or lowered position by the set screw 117. The swivel bolts 86 and 87 are then detached from the supporting members 78 and 79. Then, the forward draft link connection 25 of the plow is detached from the draft bail 20. The tractor is ready to be driven away upon the detaching of an adjusting link 118.

It is, therefore, obvious that a simple hydraulic lift mechanism for both the two-way plow and a one-way plow has been described, as well as structure for the quick attaching and detaching of the implement attachments.

As the connections described permit free movement of the plow with respect to the tractor, it is necessary that they be supported in such a manner as to maintain a fixed plowing depth. For this purpose the forward end of the plow has journaled thereon a crank axle 119, the lower end of which has journaled thereon a gauge wheel 120 in advance of the plow bottom 35. As each of the gauge mechanisms for each plow beam is similar, like reference characters will denote similar parts for the gauging mechanism for both the one and the two-way plow constructions. The upper crank or arm of the axle is journaled in suitable bracket members 121 depending from the plow beam and has secured thereto an upright arm 122. The arm 122 is connected to the upstanding arm 19 by means of the link 118, which is preferably formed at its forward end with a threaded portion to be adjusted by a pivoted adjusting nut 123 mounted on the arm 19. This link, it will be seen, maintains a fixed distance between the arm 122 on the crank axle 119 and the arm 19, to which the draw-bar is attached. Therefore, when the draw-bar is adjusted by the lever 21, a pull is exerted on the link 118 and the crank axle 119 is swung downwardly, thereby lowering the gauge wheel 120 to decrease the depth of the plow. Lowering of the draft bar 20 will correspondingly raise the gauge wheel and allow the plow to go deeper. It will also be seen that, when the plow is lifted for transporting, the pivoting movement of the plow about its hitch will cause the arm 122 to be thrust rearwardly to some degree, as the draw-bar 20 remains stationary, thereby swinging the gauge wheel upwardly on the beam, thus affording greater clearance.

Accordingly, it will be clear that the novel arrangement of the plow beam construction and its corresponding lift mechanism, which has been described, provide a freely floating plow attachment including a depth gauge carried on the plow and adjustable by means of the mechanism mounted on the tractor and acting on the gauge means through vertical adjustments imparted to the draft connections between the plow and tractor. The aforesaid adjusting mechanism for the gauge means is the subject-matter of a patent to A. C. Lindgren et al. 1,941,013, and is only shown here to better disclose an operable plow construction.

The specific construction herein described and illustrated is obviously capable of certain modifications without departure from the scope of the invention as defined in the following claims.

What is claimed is:

1. The combination with a motor propelled vehicle having a power lift mechanism actuated from the motor, of an implement attachment comprising a plurality of movable mounted implement gangs adapted for alternate movement, lifting means for connecting each of the implement gangs to the aforesaid power lift mechanism, said lifting means comprising lost-motion connections and latching means for latching the implement gangs in raised position, and locking means associated with the power lift mechanism whereby, after the implement gangs have been raised to transport position, the power lift mechanism may be actuated to lock the aforesaid latching means.

2. The combination with a motor propelled vehicle having a power lift mechanism actuated from the motor, of an implement attachment comprising a plurality of movably mounted implement gangs adapted for alternate movement, lifting means mounted on said vehicle for alternate movement in opposite directions, means for connecting the lifting means to the aforesaid power lift mechanism comprising a lost motion connection, latching means for latching each of the implement gangs in raised position, and locking means associated with the power lift mechanism whereby, after either of the implement gangs has been raised to transport position, the power lift mechanism may be actuated to lock each of the aforesaid latching means.

3. The combination with a motor propelled vehicle, of a power lift mechanism actuated from the motor and having an eccentric crank portion adapted for alternate movement in opposite directions, an implement attachment comprising a movably mounted implement gang adapted for alternate raising and lowering, lifting means for connecting the implement gang to the eccentric crank portion and having a lost-motion connection, latch means for locking said implement gang in raised position, and means on said eccentric crank portion for engaging said latch means when the implement gang is in raised position for locking the implement gang in transport.

4. The combination with a motor propelled vehicle, of a power lift mechanism actuated from the motor and having an eccentric crank portion adapted for alternate movement in opposite directions, an implement attachment comprising a movably mounted implement gang adapted for alternate raising and lowering, lifting means for connecting the implement gang to the eccentric crank portion and having a lost-motion connection, latch means for locking said implement gang in raised position, means on said eccentric crank portion for engaging said latch means when the implement gang is in raised position, and said latch means being offset so as not to be engaged by the eccentric crank portion when the implement gang is in lowered position upon the alternate movement of the crank portion in either direction.

5. The combination with a motor propelled vehicle, of an implement attachment comprising a movably mounted implement gang adapted for alternate raising and lowering, lifting means adapted for alternate movement in opposite directions mounted on the vehicle and connected to the implement gang, means for alternating the lifting means including a lost-motion connection, a pivoted latch mounted on said lifting means, stop means on said vehicle adapted to be engaged by said pivoted latch, said pivoted latch comprising a fixed cam surface for riding over said stop on the raising of said implement gang to transport position, a curved latch member pivotally mounted on said pivoted latch and adapted to engage said stop when the implement gang is in raised position, a hand lifting member connected to said pivoted latch for releasing said latch, and said curved latch member, when said pivoted latch is released, being adapted to guide said pivoted latch over said stop.

6. The combination with a motor propelled vehicle, of a power lifting mechanism actuated from the motor and having a crank portion adapted for alternate movement in opposite directions, an implement attachment comprising a movably mounted implement gang adapted for alternate raising and lowering, lifting means adapted for alternate movement in opposite directions mounted on the vehicle and connected to the implement gang, means for connecting the lifting means to the crank portion, latch means connected to said lifting means for latching the implement gang in raised position, said latch adapted to be engaged by said crank portion when said crank portion is in lowered position and said latch is in locked position after said implement gang has first been raised and then said crank portion placed in lowered position with the implement gang still in raised position, and a lost motion connection in said connecting means whereby said crank portion is free to be reciprocated in either direction to lock or release said latch means.

7. The combination with a motor propelled vehicle having a narrow longitudinal body portion, of an implement attachment, comprising a movably mounted implement gang mounted for lateral movement, lifting means for said implement gang, a support mounted on the aforesaid body portion, a transversely extending guide member having a downwardly and an outwardly and upwardly extending portions pivotally mounted on said vehicle for vertical movement, said guide member having a lower surface of the outwardly and upwardly extending portion engaging the implement gang whereby, as the implement gang is raised, the implement gang is guided laterally outwardly from underneath the narrow longitudinal body portion of the vehicle and when it is in raised position the guide member prevents lateral movement of the implement gang toward the longitudinal body portion, and means on the support engaging the aforesaid downwardly extending portion for limiting the downward movement of said guide member when the implement gang is lowered.

8. The combination with a wheeled frame, of an implement attachment comprising a movably mounted implement beam, lifting means mounted on said wheeled frame for raising and lowering said implement beam, said lifting means comprising a member adapted for alternate movement in opposite directions and a plurality of laterally spaced parallel lifting links mounted on the aforesaid member, at least one of said links being adjustable in length, means for attaching said lifting links to the aforesaid member and to said implement beam whereby the implement beam has a free lateral swinging movement as well as a free longitudinal swinging movement, and means for adjusting said adjustable lifting link whereby the implement beam may be tilted about the other lifting link.

9. In combination, an implement carrying frame, an implement mounted for movement from one position to another on said frame, power means for moving the implement, latch means for retaining the implement independently of the power means upon movement to one of said positions, and locking means associated with the power means for locking the latching means.

10. In combination, an implement carrying frame, an implement mounted for movement from one position to another on said frame, power means for moving said implement, a pivoted latch mounted on the power means, stop means on said frame adapted to be engaged by said latch for retaining the implement in one of said positions, and a pivotal member on said latch for guiding the latch over the stop means when the same is released for movement of the implement to another position.

11. In combination, an implement carrying frame, an implement gang mounted on said frame for free swinging movement, power means for moving the implement gang, and guiding means comprising a swingable member on the frame for engaging the implement gang to cause positive lateral movement of the same when the power means is actuated.

12. In combination, an implement carrying frame, an implement gang mounted for free swinging movement on said frame, power means for raising and lowering said implement gang, and a swingable arm carried by the frame and having an upwardly and outwardly extending surface adapted to be engaged by the implement gang to positively guide and hold the same outwardly when the power means is actuated to raise the implement.

13. The combination with a motor propelled vehicle having a power lift mechanism actuated from the motor, of an implement mounted on the vehicle for movement, lifting means for connecting the implement to the power lift mechanism having a lost-motion connection, latching means for latching the implement in lifted position, and locking means associated with the power lift mechanism whereby after the implement has been raised to its lifted position the power lift mechanism may be actuated to lock the aforesaid latching means.

14. In combination, an implement carrying frame, an implement mounted for movement from one position to another on said frame, power means for moving said implement, a pivoted latch mounted on the power means, stop means on said frame adapted to be engaged by said latch for retaining the implement in one of said positions, and means for guiding the latch over the stop means which comes automatically into play when the latch is released for movement of the implement to another position.

ALEXUS C. LINDGREN.
JAMES MORKOVSKI.